3,692,631
METHOD FOR BACTERIAL PROTEINASE

Alworth D. Larson and Hugh D. Braymer, Baton Rouge, and Evest A. Broussard III, Metairie, La., assignors to Research Corporation, New York, N.Y.
No Drawing. Filed Feb. 19, 1970, Ser. No. 12,850
Int. Cl. C12d 13/10
U.S. Cl. 195—66 R  2 Claims

ABSTRACT OF THE DISCLOSURE

High yields of extracellular proteinase are elaborated when a specific strain of Serratia marcescens (ATCC No. 25,419) is cultured under areobic conditions in a protein-containing nutrient medium. The proteinase, isolated from cell-free culture, is most effective at alkaline pH's and is suitable for use as an additive to lanudry detergents or in laundry presoak compositions.

---

This invention relates to a method for the preparation of a bacterial proteinase active at alkaline pH's.

As is well known, proteolytic enzymes catalyze the degradation of proteins to peptides and/or amino acids. Enzymes such as papain, pepsin and ficin have been isolated from natural sources and are used in the food, leather and textile processing industries. It is also known that a wide variety of fungi produce appreciable amounts of proteolytic enzymes. Such fungal proteases consist of a mixture of enzymes classified according to the pH's at which they are effective in the digestion of casein. The art recognizes three types of protein hydrolyzing enzymes with respect to pH conditions, namely those which exhibit optimum activity at an acid pH, those which exhibit optimum activity at a near neutral pH, and those which exhibit optimum activity at an alkaline pH. Proteinases effective at alkaline pH's have been found to be particularly useful as additives to laundry detergents or in laundry presoak compositions.

Unlike fungi, rather few bacterial species, generally pathogenic bacilli, have the ability to synthesize extracellular proteolytic enzymes. The non-pathogenic bacterium Serratia marcescens is known to excrete relatively small quantities of such enzymes.

We have discovered a new strain of Serratia marcescens which elaborates exceptionally large quantities of proteinase effective at alkaline pH's. The proteinase can be readily isolated from cell-free solution as a stable solid and, when desired, purified to a substantially homogenous entity.

In its broadest aspect, the present invention is a method for the preparation of a bacterial proteinase effective at alkaline pH's which comprises culturing a strain of Serratia marcescens (ATCC No. 25,419), American Type Culture Collection, 12301 Parklawn Drive, Rockville, Md., under aerobic conditions in a nutrient medium containing available protein and nutritive salts. In its preferred embodiment, the invention involves recovery of the enzyme from the cell-free medium.

The culture medium used in the present invention contains about 1–5% protein and/or protein-derived nutrients such as gelatin, casein, liver extract, beef extract, peptonized meat extracts, peptonized casein, heart extracts, milk proteins or the like. The protein substrate utilized should be relatively free of amino acids or other protein degradation products of low molecular weight, which would inhibit formation of proteinase by the microorganisms being cultured. For the same reason, the medium should contain only very little carbohydrate.

When gelatin is used as the sole protein source, the culture medium should also have added thereto glycerol and suitable amounts of the well known nutritive mineral salts of iron, zinc, copper, manganese and calcium. Potassium phosphate and magnesium sulfate are particularly valuable additives in promoting the maximum production of enzymes.

The pH of the culture medium should be between about 6.0 and 8.5. Superior results are obtained when the medium is kept slightly alkaline with a phosphate buffer system.

Cultivation should be at about or slightly above room temperature for about 24–48 hours. An adequate supply of air is provided, generally by bubbling air through the medium or by shaking. Anti-foaming agents such as naturally occurring oils and silicone oils may be added to prevent foaming.

Proteolytic enzyme activity can be followed by one or more of several methods which have been described in the literature. See, for example, a number of such methods are described in "Methods in Enzymology," vol. II, by Colowick and Kaplan (Academic Press, 1952). Activity is most conveniently followed by measuring those degradation products which are soluble in a 5–10% solution of trichloroacetic acid.

Proteinase is elaborated during the active growth phase of the microorganism and is usually complete within 36 hours. However, the stability of the enzyme is so great that only a small decrease in enzyme activity occurs if Serratia marcescens cultivation is continued beyond the point of maximum activity.

Essentially all of the proteinase activity is found in the cell-free culture fluid and the proteinase containing solution may be used as such. Crude proteinase is separated by bringing the culture supernatant to 80% saturation with ammonium sulfate and centrifuging out the precipitate. If desired, the crude proteinase may be purified by conventional precipitation and/or adsorption techniques, e.g., fractional precipitation with ammonium sulfate and/or chromatographic separation.

Our invention is further illustrated by means of the following non-limiting examples.

(I) ENZYME PREPARATION

A sterile nutrient medium containing:

| | Grams |
|---|---|
| Tryptose | 10 |
| Gelatin | 10 |
| Water to 1 liter. | | was inoculated with a strain of Serratia marcescens (ATCC No. 25,419) and incubated at 25° C. with good aeraton. Maximum proteinase elaboration occurred within 30–36 hours.

Similar results were obtained on cultivating the same strain of Serratia marcescens in a nutrient media containing:

| | Grams |
|---|---|
| Gelatin | 10 |
| Glycerol | 12 |
| Nutritive salts mixture | 100 |
| Water to 1 liter. | |

(II) ENZYME ISOLATION AND PURIFICATION

Bacterial cells are separated from the culture medium preferably by centrifugation. The cell-free centrifugate is cooled to 4° C. and crude proteinase precipitated by slowly adding solid ammonium sulfate to 0.8 saturation. The precipitated enzyme is separated and then dissolved in a minimal amount of 0.05 M phosphate pH 6.7 buffer. Impurities are precipitated by bringing the buffered solution to 0.3 saturation with solid ammonium sulfate. The supernatant fluid, after separation of the initial precipitate, is brought to 0.5 saturation with solid ammonium sulfate. The second precipitate contains 72% of the proteinase activity initially present.

The proteinase is further purified by dissolving in cold 0.05 M phosphate pH 8.0 buffer and dialyzing the system in the cold against three changes of the same buffer solution. The dialyzed enzyme is then fractionated on a diethylamino ethyl cellulose column using a gradient from 0.05 M to 0.3 M phosphate pH 8.0 buffer.

Proteinase elution is followed by measuring the optical density at 280 m$\mu$. The active fractions are combined, dialyzed against distilled water and lyophilized. The average yield is 1.5 to 2.0 grams of purified proteinase from 12 liters of cell-free medium. The purification procedure and activity observed in a typical preparation is summarized below:

|  | Volume in ml. | Total activity in units $\times 10^{-5}$ | Specific activity, units mg. | Recovery, percent |
|---|---|---|---|---|
| Culture medium | 12,000 | 10.8 | 10 | 100 |
| Precipitate with 0.8 saturated NH$_4$SO$_4$ |  | 8.3 | 43 | 77 |
| Precipitate with 0.5 saturated NH$_4$SO$_4$ |  | 7.8 | 167 | 72 |
| Active fractions from Deae-cellulose column | 150 | 6.0 | 450 | 56 |

A unit is that quantity of trichloroacetic acid soluble material produced by the enzyme in digesting casein for 20 minutes at 30° C. having an optical density of 0.1 at 280 m$\mu$.

The following table illustrates the amount of proteinase elaborated by Serratia marcescens ATCC No. 25,419 as contrasted with two typical strains of Serratia marcescens under comparable culture conditions.

Strain: Activity units/ml.
  Ordinary _____ 1
  Brew _____ 8–9
  ATCC No. 25,419 _____ 121

The purified enzyme elaborated by Serratia marcescens ATCC No. 25,419 is essentially homogeneous as determined by analytical gel disc electrophoresis, by analytical ultracentrifugation and by immunological methods. It has a molecular weight of about 52,000 as determined by sedimentation equilibrium.

The proteinase elaborated by Serratia marcescens ATCC No. 25,419 exhibits optimum proteolytic activity at pH 9.6–9.8 with good activity at pH's in the range 7.0–10.0. The proteinase was tested and found effective on a wide variety of protein substrates digesting the substrate to soluble peptides but not to free amino acids.

The dried enzyme showed good stability alone or in combination with commercial detergent formulations. When tested in a laundry solution containing 0.3% by weight of detergent, the enzyme, at a concentration of 5 ug of purified enzyme/ml., retained 67% of its original activity after 20 minutes at 30° C. The stability of the enzyme at a concentration of 10 $\mu$g./ml. at 50° C. was as follows:

Time, minutes: Percent activity remaining
  0 _____ 100
  5 _____ 84
  10 _____ 53
  20 _____ 31
  30 _____ 18

The crude, partially purified and purified proteinases described above can be used as an additive to laundry detergent preparations or in laundry presoak preparations. For economic reasons, the partially purified enzyme is preferred for commercial formulations.

We claim:
1. A method for the preparation of a bacterial proteinase effective at alkaline pH's which comprises culturing a strain of Serratia marcescens (ATCC No. 25,419) under aerobic conditions in a nutrient medium containing available protein.
2. A method according to claim 1 wherein the proteinase is recovered from the cell-free nutrient medium.

References Cited
FOREIGN PATENTS
10,193    1966    Japan _____ 195—66

LIONEL M. SHAPIRO, Primary Examiner

U.S. Cl. X.R.
252—DIG. 12